US009468883B2

(12) United States Patent
Remias et al.

(10) Patent No.: US 9,468,883 B2
(45) Date of Patent: Oct. 18, 2016

(54) SOLVENT AND METHOD FOR REMOVAL OF AN ACID GAS FROM A FLUID STREAM

(71) Applicant: The University of Kentucky Research Foundation, Lexington, KY (US)

(72) Inventors: Joseph E. Remias, Lexington, KY (US); Cameron A. Lippert, Lexington, KY (US); Kunlei Liu, Lexington, KY (US)

(73) Assignee: THE UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 279 days.

(21) Appl. No.: 13/853,186

(22) Filed: Mar. 29, 2013

(65) Prior Publication Data

US 2014/0294704 A1 Oct. 2, 2014

(51) Int. Cl.
*B01D 53/14* (2006.01)

(52) U.S. Cl.
CPC ....... *B01D 53/1475* (2013.01); *B01D 53/1493* (2013.01); *B01D 2252/20421* (2013.01); *B01D 2252/20426* (2013.01); *B01D 2252/20431* (2013.01); *B01D 2252/20484* (2013.01); *B01D 2252/20489* (2013.01); *B01D 2252/502* (2013.01); *B01D 2252/504* (2013.01); *Y02C 10/04* (2013.01); *Y02C 10/06* (2013.01)

(58) Field of Classification Search
None
See application file for complete search history.

(56) References Cited

U.S. PATENT DOCUMENTS

| | | |
|---|---|---|
| 4,240,922 A | 12/1980 | Sartori et al. |
| 4,376,101 A | 3/1983 | Sartori et al. |
| 4,407,784 A | 10/1983 | Blanc et al. |
| 4,545,965 A | 10/1985 | Gazzi et al. |
| 4,729,883 A | 3/1988 | Lam et al. |
| 5,026,904 A | 6/1991 | Lodge et al. |
| 5,618,506 A | 4/1997 | Suzuki et al. |
| 5,911,964 A | 6/1999 | Iwanami et al. |
| 6,165,432 A | 12/2000 | Rooney |
| 6,337,059 B1 | 1/2002 | Schubert et al. |
| 6,582,498 B1 | 6/2003 | Sass et al. |
| 6,740,230 B1 * | 5/2004 | Hugo et al. ........... 208/237 |
| 6,921,733 B2 | 7/2005 | Mahajan |
| 7,056,482 B2 | 6/2006 | Hakka et al. |
| 7,601,315 B2 | 10/2009 | Ouimet |
| 7,758,673 B2 | 7/2010 | Brok et al. |
| 7,763,562 B2 | 7/2010 | Voskoboynikov et al. |
| 7,939,461 B2 | 5/2011 | Fukuzumi et al. |
| 8,329,929 B2 | 12/2012 | Matsunaga et al. |
| 2002/0081256 A1 | 6/2002 | Chakravarti et al. |
| 2008/0025893 A1 | 1/2008 | Asprion et al. |

(Continued)

FOREIGN PATENT DOCUMENTS

| | | |
|---|---|---|
| CA | 1277985 C | 12/1990 |
| JP | 11079725 A | 3/1999 |

(Continued)

OTHER PUBLICATIONS

Atkins et al., "N-Sulfonylamines", Journal of the American Chemical Society, 89:10, May 10, 1967, pp. 2502-2503.*

(Continued)

*Primary Examiner* — Jennifer A Smith
*Assistant Examiner* — Anita Nassiri Motlagh
(74) *Attorney, Agent, or Firm* — King & Schickli, PLLC

(57) ABSTRACT

A solvent for removal of an acid gas from a fluid stream includes a promoter amine with a pKa of between 6.5 and 10.5 and a tertiary amine with a pKa of between 8.5 and 10.5.

15 Claims, 5 Drawing Sheets

(56) References Cited

U.S. PATENT DOCUMENTS

| | | |
|---|---|---|
| 2009/0214408 A1 | 8/2009 | Blake et al. |
| 2010/0011958 A1* | 1/2010 | Cadours ............ B01D 53/1425 95/187 |
| 2010/0105909 A1 | 4/2010 | Matsunaga et al. |
| 2010/0192770 A1 | 8/2010 | Andarcia et al. |
| 2011/0015059 A1 | 1/2011 | Matsunaga et al. |
| 2011/0168019 A1 | 7/2011 | Northrop et al. |
| 2011/0176981 A1 | 7/2011 | Jacquin et al. |
| 2012/0021897 A1 | 1/2012 | Iwata et al. |
| 2012/0060686 A1* | 3/2012 | Kortunov et al. ................ 95/26 |
| 2012/0063978 A1 | 3/2012 | Baugh et al. |
| 2012/0063980 A1 | 3/2012 | Kortunov et al. |
| 2012/0237421 A1 | 9/2012 | Millner et al. |

FOREIGN PATENT DOCUMENTS

| | | |
|---|---|---|
| JP | 2003260364 A | 9/2003 |
| WO | 2012034027 A1 | 3/2012 |

OTHER PUBLICATIONS

Piperazine—Wikipedia, the free encyclopedia.*

Sigma-Aldrich, N-Methyldiethanolamine (MDEA) Product Specification.*

J. Cullinane, et al.; "Kinetics of Carbon Dioxide Absorption into Aqueous Potassium Carbonate and Piperazine"; Industrial & Engineering Chemistry Research 2006, vol. 45, No. 8, pp. 2531-2545.

* cited by examiner

US 9,468,883 B2

SOLVENT AND METHOD FOR REMOVAL OF AN ACID GAS FROM A FLUID STREAM

TECHNICAL FIELD

This document relates to the removal of $CO_2$ and other acid gases from a fluid stream and more particularly to a solvent of promoter and tertiary amines used for separating an acid gas from that fluid stream.

BACKGROUND

The cleanup of acid gasses or sour gas, such as $CO_2$ in particular, from natural gas and in oil refining has been an extensively practiced technology. The industrial removal of $CO_2$ from natural gas dates back to the 1930's. In the $21^{st}$ century, due to the potential impact of anthropogenic $CO_2$ emissions on the climate, post-combustion $CO_2$ capture has gained tremendous attention. While several technologies exist for the removal of acid gasses, one of the most commonly employed practices is the use of aqueous amines. Of these amines, tertiary amines are often used for natural gas applications due to their low energy of regeneration. For post-combustion $CO_2$ capture applications primary and secondary amines tend to be in part favored by their faster rate at the low driving force condition. Regardless of the application, the mass transfer rate in the absorber column dictates the size of the column (capital cost) used and, consequently, has a substantial impact on the overall process cost. An overall process depicting a thermal swing process is presented in FIG. 1. An aqueous amine solution is circulated between the absorber 10 and stripper 12. The $CO_2$ containing gas enters the bottom of the absorber where it contacts the aqueous amine absorbent removing it from the gas stream. The liquid solution, $CO_2$ rich amine solution, is then passed through a heat exchanger 14 to improve efficiency before being heated to a higher temperature in the stripper 12. The stripper 12 removes the $CO_2$ as a gas from the amine solution to produce a lean, or $CO_2$ deficient solution. The lean solution is returned to the absorber 10 by way of the heat exchanger to repeat the process.

In order to minimize system capital (absorber cost) it is important to maximize the overall mass transfer rate for the scrubber system as there is a direct correlation between the two. Primary ($RNH_2$) and secondary ($R_2NH$) amines are capable of achieving a high mass transfer rate per unit due to the direct chemical reaction with $CO_2$ to form a carbamate. However, they show a lower than desirable capacity. It requires 2 moles of amine to capture 1 mole of $CO_2$ since the carbamate is then negatively charged another amine must absorb the proton formed. Furthermore, due to the high enthalpy of absorption from the formation of the carbamate the regeneration energy is high. Tertiary amines ($R_3N$) show a significant decrease in mass transfer rates due to the inability to react with $CO_2$ directly; however, they show significantly lower heats of regeneration. The described process seeks to exploit the advantages of both systems without inheriting the limitations exhibited by either. More specifically, by promoting the $CO_2$ capture reaction rate the absorber will be smaller and reduce the process capital. The intrinsic lower energy of regeneration for the tertiary amine solvent minimizes operating costs.

While gas sweetening applications represent the most immediate opportunity for application of the described invention, post-combustion $CO_2$ capture could represent a large potential application of the described technology. The market driver for this application will be the regulation of $CO_2$ emissions due to concern about its environmental impact towards global climate change or a need for $CO_2$ for utilization purposes such as enhanced oil recovery (EOR). Carbon dioxide capture and sequestration (CCS) from large stationary sources such as fossil fuel combusting electricity generators represents one method to reduce the increase in atmospheric $CO_2$ levels. The challenges of post-combustion $CO_2$ capture include the fact that flue gas from utility boilers is at near atmospheric pressure and the concentration of $CO_2$ in the flue gas is relatively low at 12-14%. Another technical hurdle is the energy requirements for the $CO_2$ capture/desorption devices to regenerate absorber reagents. Generally speaking, the energy required for $CO_2$ capture and sequestration using MEA is estimated to reduce a PC plant's output by about 30 percent, which equates to a very substantial 60-80% increase in the cost of electricity. The ability to capture and store $CO_2$ more efficiently will be highly valued by utilities.

In broad terms the described method seeks to add a promoter amine, in the form of a substituted primary and/or secondary amine to a tertiary amine to form a solvent. The promoters serve to increase the overall mass transfer of the acid gas into the absorption solvent. The promoters are designed to have particularly low volatility without contributing significant viscosity to the solution. The described promoters achieve this attribute without being an ionic compound which can negatively impact mass transfer. The low volatility and low viscosity are achieved by using alternate functional groups in addition to the amine functional group that reacts with the $CO_2$ molecule. Low volatility is important to reduce amine loss in the $CO_2$ capture process. This property is often achieved by using alcohol groups in addition to the amine group. However, the alcohol groups are hydrogen bond donors which add more solution viscosity due to intermolecular bonding.

SUMMARY

A solvent is provided for the removal of an acid gas such as carbon dioxide from a fluid stream such as a flue gas stream. The solvent comprises (a) a promoter amine selected from a group of amines consisting of primary amines with a pKa between 6.5 and 10.5, secondary amines with a pKa between 6.5 and 10.5 and mixtures thereof and (b) a tertiary amine with a pKa of between 8.5 and 10.5. More particularly the solvent includes 0.01-15.0 weight percent promoter amine, 10.0-65.0 weight percent tertiary amine and 34.44-89.99 weight percent water.

The promoter amine includes at least one non-volatilizing functional group selected from a group consisting of —$SO_2$, —$OP(OR)_3$, —CN, —$OPR_3$, —OR and —COOR and mixtures thereof where R=—H or alkyl. In one embodiment the promoter amine is 3-N-sulfonylamine (SA). In one embodiment the promoter is N-methyltetrahydrothiophen-3-amine 1,1-dioxide. In one embodiment the promoter is 2,2'-sulfonyldiethanamine. In one embodiment the promoter is 3,3'-sulfonyldipropaneamine. In one embodiment the promoter is 4,4'-sulfonyldibutanenamine. In one embodiment the promoter is 2-aminoethyl methyl sulfone. In one embodiment the promoter amine is 3-aminopropionitrile (APN). In one embodiment the promoter is 4-aminobutanenitrile. In one embodiment the promoter is 5-aminopentanenitrile. In one embodiment the promoter is 6-aminohexanenitrile. In one embodiment the promoter is 3-(methylamino)propanenitrile. In one embodiment the promoter amine is diethyl (2-aminoethyl)phosphonate (EtP2). In one embodiment the promoter is diethyl [2-(methylamino)ethyl]phosphonate. In one embodiment the promoter is diethyl (3-aminopropyl)phosphonate. In one embodiment the promoter is diethyl (4-aminobutyl)phosphonate. In one embodiment the promoter is diethyl (5-aminopentyl)phosphonate. In one embodiment the promoter is diethyl (6-aminohexyl)phosphonate. In one embodiment the promoter is 2-(tert-butoxy)ethan-1-amine. In one embodiment the promoter is N-methyl-2-[(2-methyl-2-propanyl)oxy]ethanamine. In one embodiment the promoter amine is a mixture of two or three amines selected from a group consisting of 3-N-sulfonylamine (SA), 3-aminopropionitrile (APN) and diethyl 2-aminoethanephosphonate (EtP2). The tertiary amine is selected from a group of tertiary amines consisting of methyldiethanolamine (MDEA), triethanolamine (TEA), N,N,-dialkylethanolamine, N,N,N'N'-tetraalky-1,8-naphthalenediamine, N,N,-dialkylbenzylamine, 1,4-dialkylpiperazine, N,N,N',N'-tetraalkyl-1,6-hexanediamine, N,N,N',N'-tetraalkyl-1,5-pentanediamine, N,N,N',N'-tetraalkyl-1,4-butanediamine, N,N,N',N'-tetraalkyl-1,3-propanediamine, N,N,N',N'-tetraalkyl-1,2-ethanediamine, N,N,N',N'-tetrakis(2-hydroxyethyl)ethylenediamine, N,N,N'N'N''-pentaalkyldiethylenetriamine, N,N,N'N'N''-pentaalkyldipropylaminetriamine, N,N,-dialkylcyclohexylamine, N,N,N',N'-tetraalkylbis(aminoethyl)ether, N,N,-dimethyl-2(2-aminoethoxy)ethanol, where alkyl represents any methyl, ethyl, propyl, butyl isomer, and mixtures thereof. In one particularly useful embodiment the promoter amine comprises a mixture of 3-N-sulfonylamine (SA) and 3-aminopropionitrile (APN) while the tertiary amine is methyldiethanolamine (MDEA). More particularly the solvent comprises about 0.1 weight percent 3-N-sulfonylamine (SA), about 0.25 weight percent 3-aminopropionitrile (APN) and between about 2.0 and about 65.0 weight percent methyldiethanolamine (MDEA).

In accordance with an additional aspect, a method is provided for removing an acid gas from a fluid stream. That method comprises contacting the fluid stream with a solvent for the removal of acid gas from the fluid stream. That solvent includes a promoter amine with a pKa of between about 6.5 and 10.5 and a tertiary amine with a pKa of between 8.5 and 10.5. Other details of the solvent are the same as described above.

Additional steps of the method include binding the acid gas in the fluid stream to the solvent to form an acid gas-solvent complex, separating the acid gas solvent complex from the fluid stream, regenerating the solvent by releasing the acid gas and recycling the regenerated solvent for contacting the fluid stream.

In the following description there is shown and described preferred embodiments of the solvent and method for removing an acid gas from a fluid stream such as, for example, $CO_2$ from flue gas. As it will be realized, these solvents and methods are capable of other different embodiments and their several details are capable of modification in various, obvious aspects. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Figure 1:
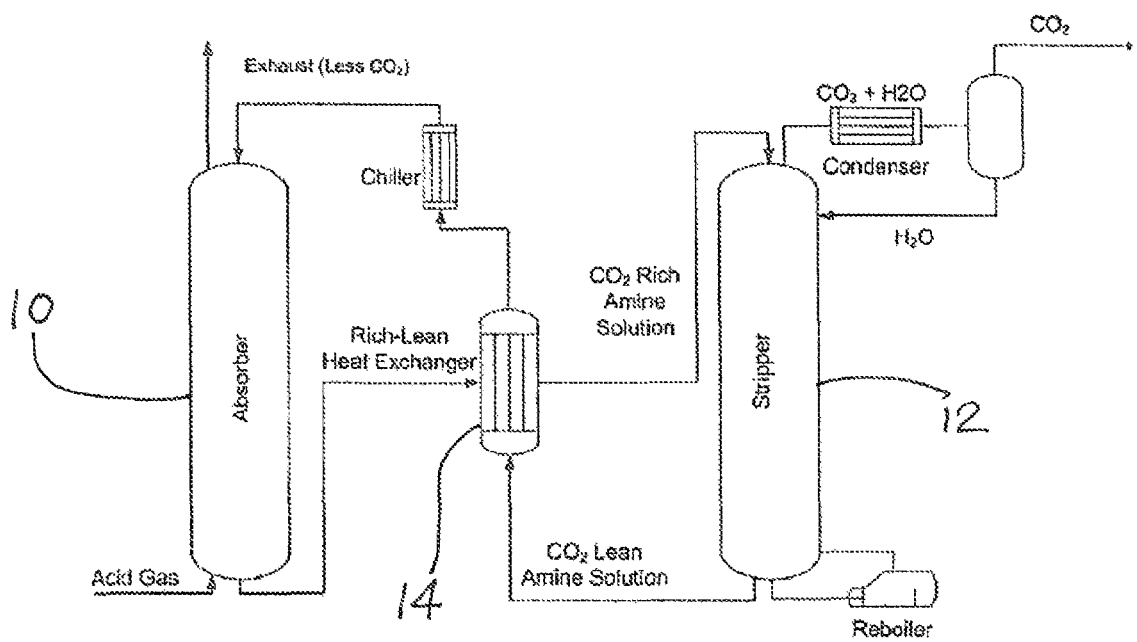
FIG. 1 is a schematical illustration of a process for removing acid gas from a fluid stream utilizing a solvent and thermal swing regeneration.

Reference will now be made in detail to the present preferred embodiment of the invention, examples of which are illustrated in the accompanying drawings.

DETAILED DESCRIPTION

A solvent or solvent system for removal of an acid gas from a fluid stream comprises a promoter amine with a pKa of between 6.5 and 10.5 and a tertiary amine with a pKa of between 8.5 and 10.5. More specifically the solvent includes about 0.01-15.0 weight percent promoter amine, about 10.0-65.0 weight percent tertiary amine and about 34.44-89.99 weight percent water.

The promoter amine useful in the solvent system includes a primary amine and/or a secondary amine with at least one non-volatilizing functional group selected from a group consisting of —$SO_2$, —$OP(OR)_3$, —CN, —$OPR_3$, —OR and —COOR and mixtures thereof where R=—H or alkyl. For purposes of this document alkyl refers to branched and unbranched alkyl compounds with between 1 and 10 carbon atoms. In one embodiment the promoter amine is 3-N-sulfonylamine (SA). In one embodiment the promoter is N-methyltetrahydrothiophen-3-amine 1,1-dioxide. In one embodiment the promoter is 2,2'-sulfonyldiethanamine. In one embodiment the promoter is 3,3'-sulfonyldipropaneamine. In one embodiment the promoter is 4,4'-sulfonyldibutanenamine. In one embodiment the promoter is 2-aminoethyl methyl sulfone. In one embodiment the promoter amine is 3-aminopropionitrile (APN). In one embodiment the promoter is 4-aminobutanenitrile. In one embodiment the promoter is 5-aminopentanenitrile. In one embodiment the promoter is 6-aminohexanenitrile. In one embodiment the promoter is 3-(methylamino)propanenitrile. In one embodiment the promoter amine is diethyl (2-aminoethyl)phosphonate (EtP2). In one embodiment the promoter is diethyl [2-(methylamino)ethyl]phosphonate. In one embodiment the promoter is diethyl (3-aminopropyl)phosphonate. In one embodiment the promoter is diethyl (4-aminobutyl)phosphonate. In one embodiment the promoter is diethyl (5-aminopentyl)phosphonate. In one embodiment the promoter is diethyl (6-aminohexyl)phosphonate. In one embodiment the promoter is 2-(tert-butoxy)ethan-1-amine. In one embodiment the promoter is N-methyl-2-[(2-methyl-2-propanyl)oxy]ethanamine. In one embodiment the promoter amine is a mixture of two or three amines selected from a group consisting of 3-N-sulfonylamine (SA), 3-aminopropionitrile (APN) and diethyl 2-aminoethanephosphonate (EtP2).

The tertiary amine is selected from a group of tertiary amines consisting of methyldiethanolamine (MDEA), triethanolamine (TEA), N,N,-dialkylethanolamine, N,N,N',N'-tetraalky-1,8-naphthalenediamine, N,N,-dialkylbenzylamine, 1,4-dialkylpiperazine, N,N,N',N'-tetraalkyl-1,6-hexanediamine, N,N,N',N'-tetraalkyl-1,5-pentanediamine, N,N,N',N'-tetraalkyl-1,4-butanediamine, N,N,N',N'-tetraalkyl-1,3-propanediamine, N,N,N',N'-tetraalkyl-1,2-ethanediamine, N,N,N',N'-tetrakis(2-hydroxyethyl)ethylenediamine, N,N,N'N'N''-pentaalkyldiethylenetriamine, N,N,N'N'N''-pentaalkyldipropylaminetriamine, N,N,-dialkylcyclohexylamine, N,N,N',N'-tetraalkylbis(aminoethyl)ether, N,N,-dimethyl-2(2-aminoethoxy)ethanol, where alkyl represents any methyl, ethyl, propyl, butyl isomer, and mixtures thereof. One particularly useful solvent embodiment comprises a promoter amine mixture of 3-N-sulfonylamine (SA) and 3-aminopropionitrile (APN) in combination with a tertiary amine of methyldiethanolamine (MDEA). More specifically the solvent comprises about 0.1 weight percent 3-N-sulfonylamine (SA), about 0.25 weight percent 3-aminopropionitrile (APN) and between about 2.0 and about 65.0 weight percent methyldiethanolamine (MDEA). The remainder is water.

Also disclosed is a method of removing an acid gas from a fluid stream. That method comprises contacting the fluid stream with a solvent for removal of the acid gas. As described above, the solvent includes a promoter amine with a pKa of between 6.5 and 10.5 and a tertiary amine with a pKa of between 8.5 and 10.5. The method further includes the step of binding the acid gas in the fluid stream to the solvent to form an acid gas-solvent complex. In addition the method includes separating the acid gas solvent complex from the fluid stream. Further the method includes regenerating the solvent by releasing the acid gas. Finally the method includes recycling the regenerated solvent for contacting the fluid stream.

The following Example is provided to further illustrate the solvent and related method for removal of an acid gas such as $CO_2$ from a fluid stream such as flue gas. While representative of the solvent and method it should be appreciated that this Example is not to be considered as limiting in scope.

EXAMPLE 1

The current solvent system/process relates to a more efficient removal of carbon dioxide from a gaseous stream containing carbon dioxide and/or other acidic gases. In particular, the method for separating carbon dioxide from a gas mixture uses a combination of less basic primary amines (pKa<10.5) containing functional groups that provide a decrease in vapor pressure and viscosity in the presence of a more basic tertiary amine (pKa>8.5).

The combination of amines provides an overall increase in the mass transfer rate to more closely resemble that of a primary amine, but maintains the low heat of regeneration exhibited by tertiary amines. The primary amines have the ability to react directly with $CO_2$ in the gas stream to form an initial carbamate which serves as a promoter (transfer agent) for the more basic tertiary amine to form bicarbonate where the $CO_2$ is now considered absorbed.

For purposes of example, the solvent system consists of 1-20 mol % of a primary amine containing a non-volatilizing functional group, $SO_2$, $OP(OR)_3$, or CN with pKa ranging between 6.5 and 10.5 and a tertiary amine, methyldiethanolamine (MDEA), triethanolamine (TEA), dimethylethanolamine (DMEA) for examples, with pKa ranging between 8.5 and 10.5. The functionalized primary amines have lower or similar vapor pressures vs. the traditional primary amines such as MEA. A low vapor pressure for the amine is critical to reduce the potential for atmospheric emissions from the absorber stack or contamination of the natural gas stream produced. Table 1 shows the low vapor pressure for compounds with representative functional groups compared to MEA. These same functional groups also aid in decreasing the viscosity of the solution due to the lack of participating in an extended H-bonding network.

TABLE 1

The vapor pressure of example amines with non-hydrogen bonding functional groups

| Functional group | Example compound | Vapor pressure (Pa)* |
|---|---|---|
| HO | Monoethanolamine (MEA) | 55 |
| SO2 | Sulfonylamine (SA) | 0 |
| CN | 3-aminopropionitrile | 89 |
| OP(OR)3 | Aminoethyl-dimethoxyphosphine oxide | 16 |

*Vapor pressure predicted using ACD/I-Lab at 25° C.

Figure 2A:
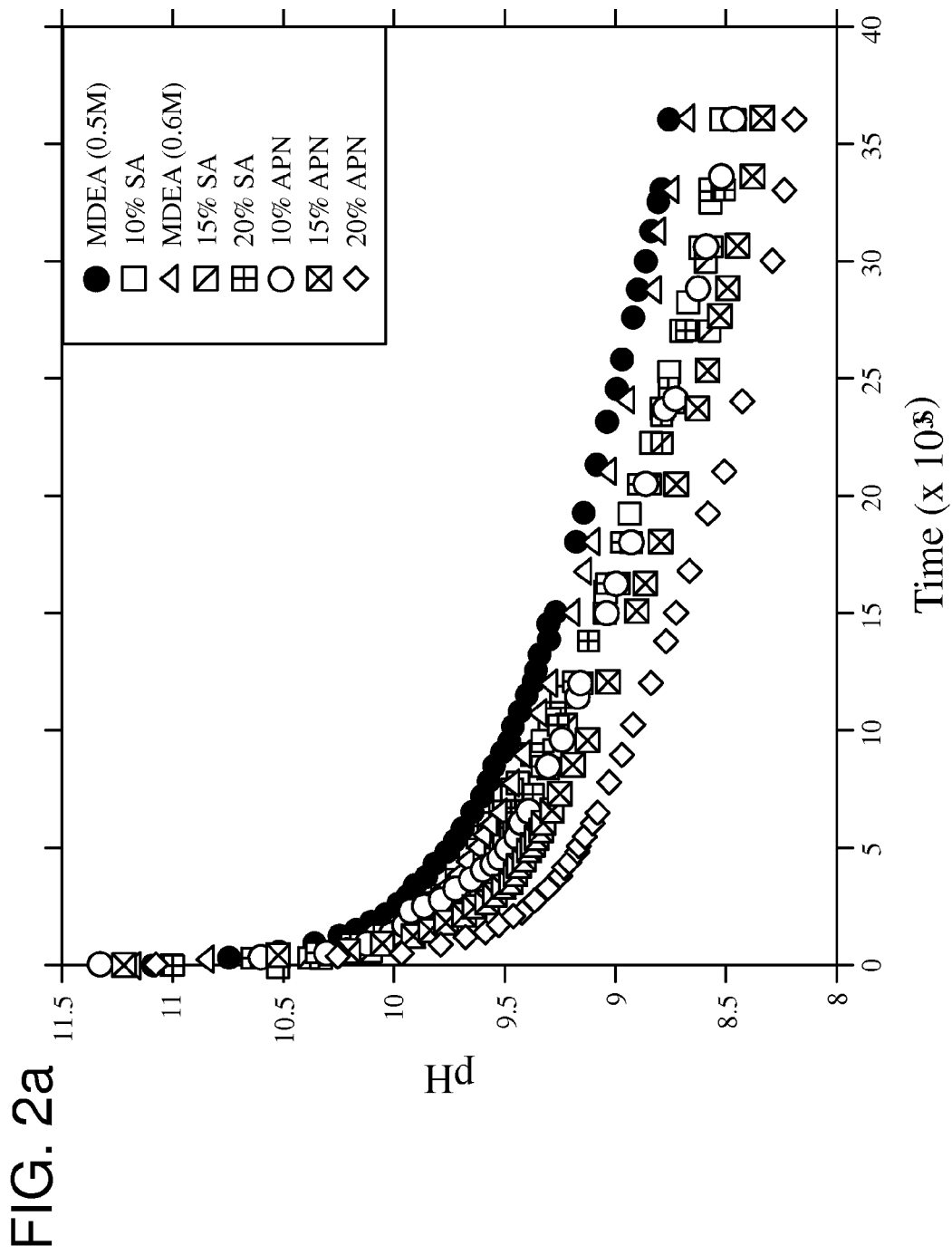
FIG. 2a is a graphical illustration of the pH-drop of a 0.5 M MDEA solution with various concentrations of solvent promoters.
Figure 2B:
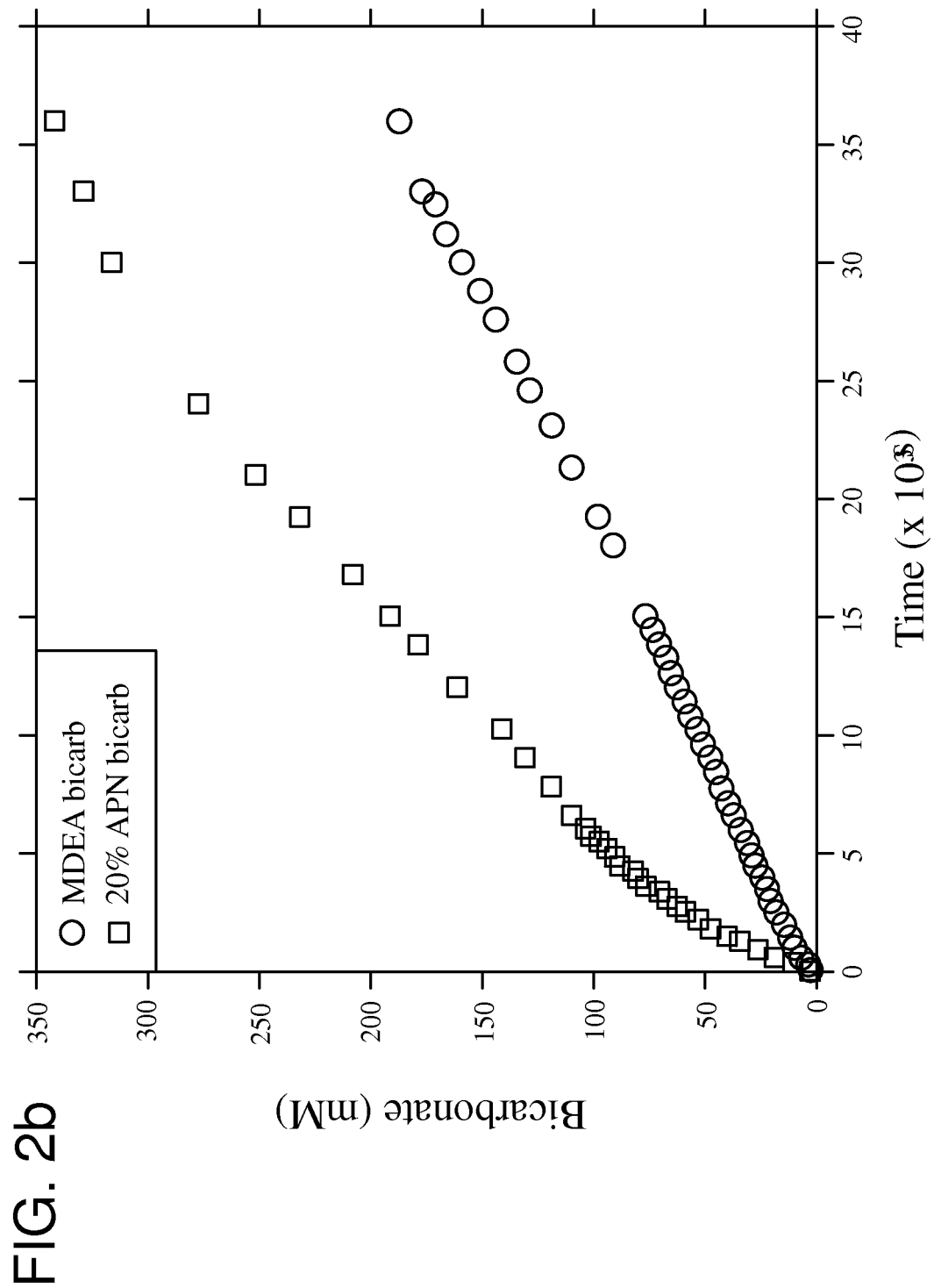
FIG. 2b is a graphical illustration of bicarbonate formation via $CO_2$ hydration in 0.5 M MDEA and 0.5 M MDEA with 20% APN.

Addition of 3-N-sulfonylamine (SA), 3-aminopropionitrile (APN), or a combination of the two to a tertiary amine solution (0.2 M-0.5 M) resulted in an up to 300% increase in relative rate of $CO_2$ hydration (FIG. 2). As shown in FIG. 2a, the relative rate of $CO_2$ hydration increases with increased amounts of solvent promoters added. However, it was observed that different promoters, based on $pK_a$, show different maximum levels of promotion. For example, SA shows no increase in promotion above ~3-5 mol % of tertiary amine concentration, while APN maintains its promoter effects up to at least 20 mol % based on tertiary amine concentration. The effectiveness of the solvent promoter was judged on its ability to increase the relative rate of bicarbonate formation from $CO_2$ and $H_2O$ (FIG. 2b). It was observed that addition of 20 mol % APN to a 0.5M MDEA solution gives significant enhancement of the relative rate of bicarbonate formation. The rate enhancement and increased bicarbonate formation is not a factor of the summation of the two amines acting independently (data not shown). If the amount of bicarbonate formed by APN independently is added to the amount of bicarbonate formed by MDEA independently then the total amount of bicarbonate is less than that of when the two are combined in one solution. This strongly suggests that APN is acting as a promoter for carbon capture by MDEA.

Figure 3A:
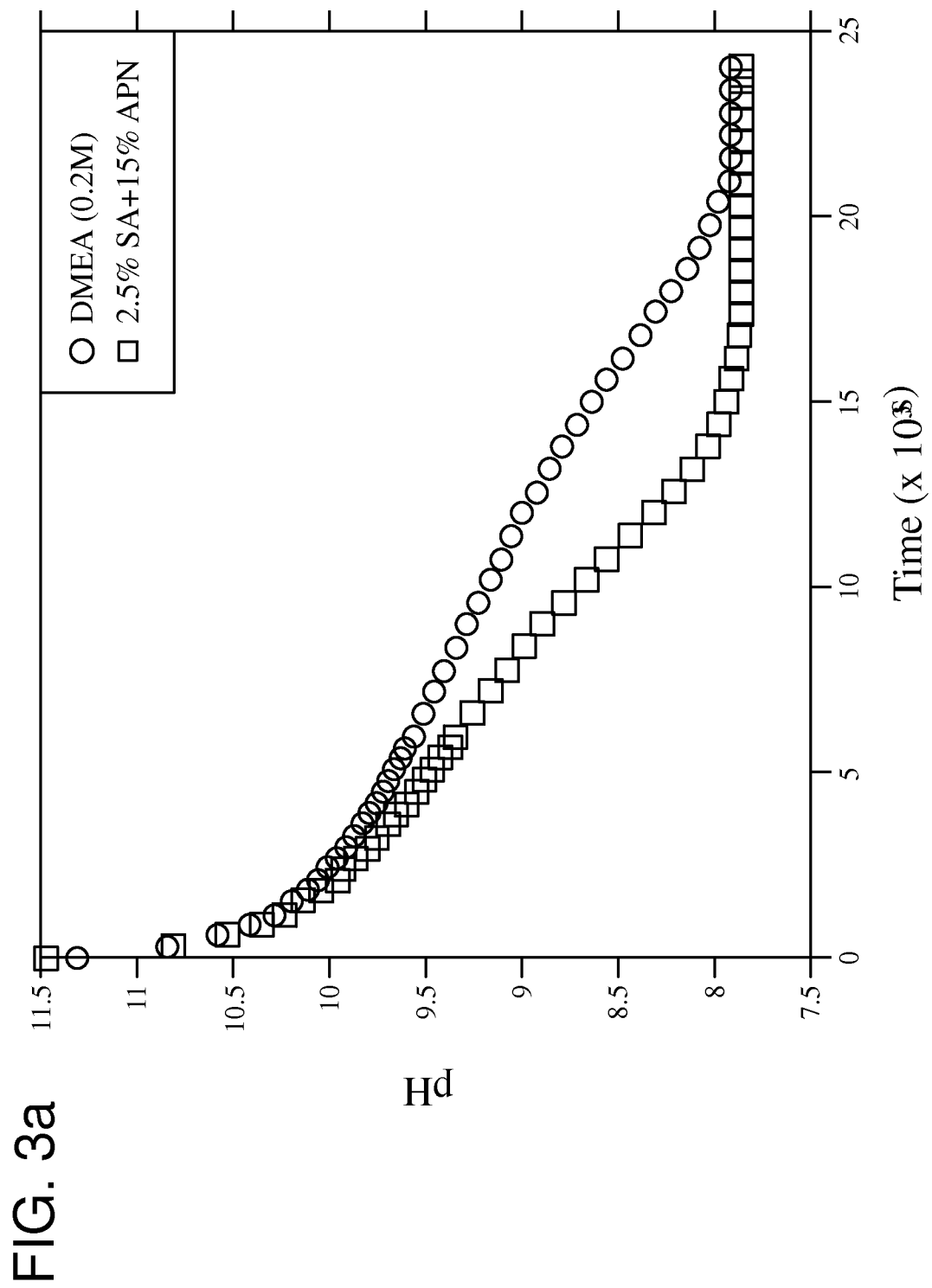
FIG. 3a is a graphical illustration of the pH-drop of a 0.2 M DMEA solution and 0.2 M DMEA solution with solvent promoters.
Figure 3B:
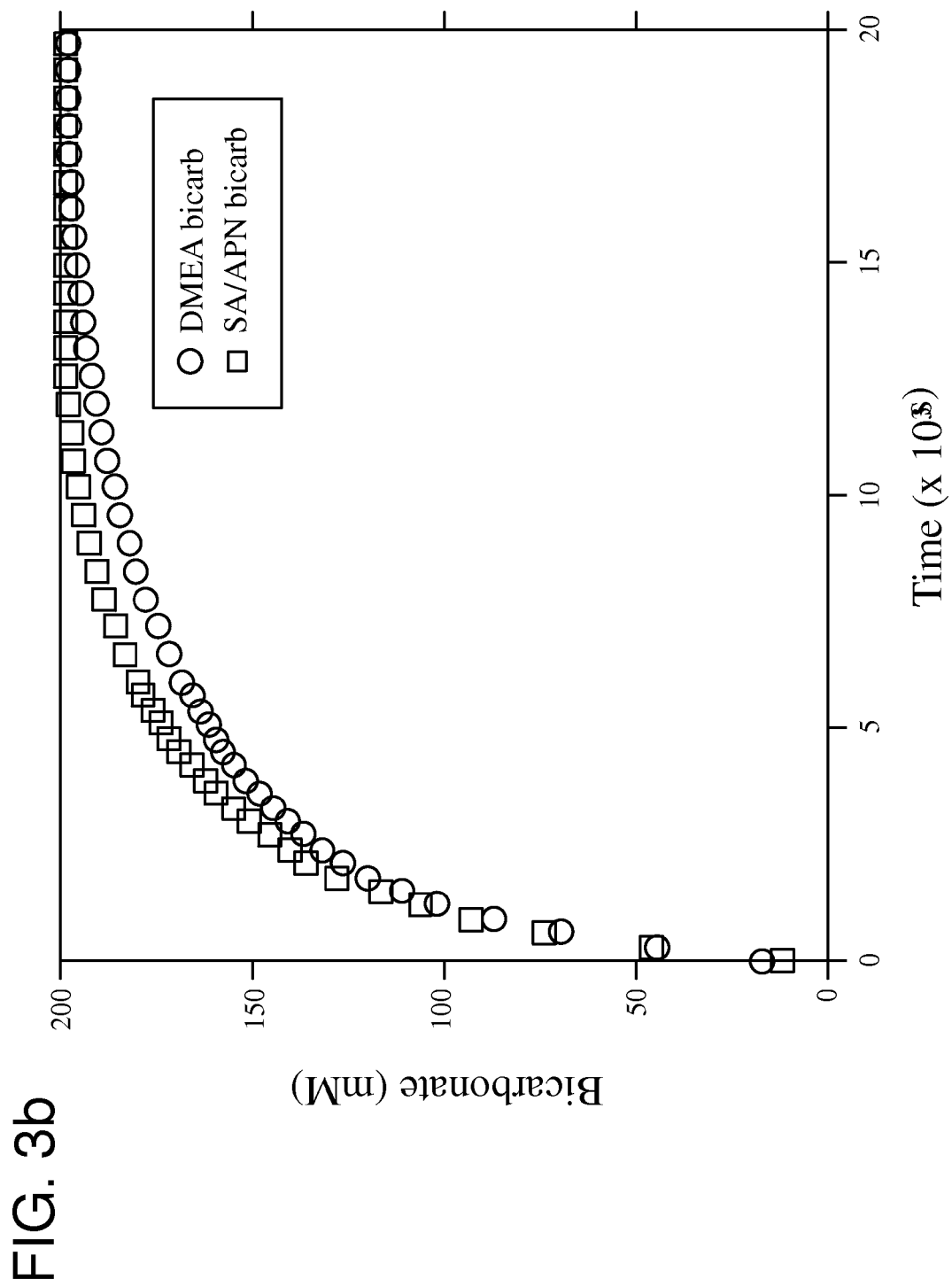
FIG. 3b is a graphical illustration of the bicarbonate formation via $CO_2$ hydration in 0.2 M DMEA and 0.2 M DMEA with a 2.5% and 15% APN mixture.

The solvent promoters show promising results in MDEA solutions. In order to understand the scope of these promoters, various solvents were tested. It was observed that the different promoters showed a varying amount of activity in other solvents. For example, the optimal mixture used for the best enhancement in MDEA (2.5% SA and 15% APN) showed a ~150% increase in relative rate in DMEA solutions (FIG. 3). While some solvents showed more significant results than others, it shows the versatility of using less basic primary amines as promoters for more basic tertiary amines.

The foregoing has been presented for purposes of illustration and description. It is not intended to be exhaustive or to limit the embodiments to the precise form disclosed. Obvious modifications and variations are possible in light of the above teachings. For example, while certain promoter amines and tertiary amines are identified above as being useful in the present solvent and method, these are to be considered illustrative of possible promoter and tertiary amines that may be used rather than limiting. Similarly, while this document references $CO_2$ capture from a flue gas, the method is suited for other applications where acid gas capture from a fluid stream is desired. All such modifications and variations are within the scope of the appended claims when interpreted in accordance with the breadth to which they are fairly, legally and equitably entitled.

What is claimed:

1. A solvent for removal of an acid gas from a fluid stream, comprising:
   a promoter amine comprising a mixture of N-sulfonylamine (SA) and 3-aminopropionitrile (APN), wherein SA comprises 3-5 mol % and APN comprises 1-20 mol %; and
   a tertiary amine with a pKa of between 8.5 and 10.5.

2. The solvent of claim 1 including 0.01 to 15.0 weight percent promoter amine, 10.0 to 65.0 weight percent tertiary amine and 34.99 to 89.99 weight percent water.

3. The solvent of claim 1, wherein said tertiary amine is selected from a group of tertiary amines consisting of methyldiethanolamine (MDEA), triethanolamine (TEA), N,N,-dialkylethanolamine, N,N,N',N'-tetraalky-1,8-naphthalenediamine, N,N,-dialkylbenzylamine, 1,4-dialkylpiperazine, N,N,N',N'-tetraalkyl-1,6-hexanediamine, N,N,N',N'-tetraalkyl-1,5-pentanediamine, N,N,N',N'-tetraalkyl-1,4-butanediamine, N,N,N',N'-tetraalkyl-1,3-propanediamine, N,N,N',N'-tetraalkyl-1,2-ethanediamine, N,N,N'N'-tetrakis (2-hydroxyethypethyl) ethylenediamine, N,N, N',N'''-pentaalkyldiethylenetriamine, N,N,N',N',N'''-pentaalkyldipropylaminetriamine, N,N,-dialkylcyclohexylamine, N,N,N',N'-tetraalkylbis (aminoethyl)ether, N,N,-dimethyl-2(2-aminoethoxy)ethanol, where alkyl represents any methyl, ethyl, propyl, butyl isomer, and mixtures thereof.

4. The solvent of claim 1, wherein said tertiary amine is selected from a grou of tertiary amines consisting of methyldiethanolamine (MDEA), triethanolamine (TEA), dimethylethanolamine (DMEA), N,N,-dimethylbenzylamine, diethylmonoethanolamine, dipropylmonoethanolamine, 1,4-dimethylpiperazine, N,N,N',N'-tetramethyl-1,6-hexanediamine, N,N,N',N'-tetrakis(2-hydroxyethyl)ethylenediamine, N,N,N',N',N'''-pentamethyldiethylenetriamine, N,N,N',N'-tetramethylethylenediamine, N,N,N',N'tetramethylpropane-1,3-diamine, N,N,N',N'-tetramethylbutane-1,4-diamine, N,N,N',N'-tetramethyl-1,5-pentanediamine, and mixtures thereof.

5. The solvent of claim 1, wherein said tertiary amine is methyldiethanolamine (MDEA).

6. The solvent of claim 5, wherein said solvent comprises about 0.1 weight percent N-sulfonylamine (SA), about 0.25 weight percent aminopropionitrile (APN) and between about 2.0 and about 65.0 weight percent methyldiethanolamine and a remainder is water.

7. The solvent of claim 1, wherein said acid gas is carbon dioxide.

8. A method of removing an acid gas from a fluid stream, comprising:
   contacting said fluid stream with a solvent for removal of said acid gas from said fluid stream, and said solvent including:
   (a) a promoter amine comprising a mixture of N-sulfonylamine and 3-aminopropionitrile, wherein N-sulfonylamine comprises 3-5 mol % and 3-aminopropionitrile comprises 1-20 mol %; and
   (b) a tertiary amine with a pKa of between 8.5 and 10.5.

9. The method of claim 8, including providing said solvent with 0.01 to 15.0 weight percent promoter amine, 10.0 to 65.0 weight percent tertiary amine and 34.99 to 89.99 weight percent water.

10. The method of claim 8, including using a tertiary amine selected from a group of tertiary amines consisting of methyldiethanolamine (MDEA), triethanolamine (TEA), dimethylethanolamine (DMEA), N,N,-dimethylbenzylamine, diethylmonoethanolamine, dipropylmonoethanolamine, 1,4-dimethylpiperazine, N,N,N',N'-tetramethyl-1,6-hexanediamine, N,N,N',N'-tetrakis(2-hydroxyethyl)ethylenediamine, N,N,N',N',N'''-pentamethyldiethylenetriamine, N,N,N',N'-tetramethylethylenediamine, N,N,N',N'tetramethylpropane-1,3-diamine, N,N,N',N'-tetramethylbutane-1,4-diamine, N,N,N',N'-tetramethyl-1,5-pentanediamine, and mixtures thereof.

11. The method of claim 8, including methyldiethanolamine (MDEA) as said tertiary amine.

12. The method of claim 8, further including binding acid gas in said fluid stream to said solvent to form an acid gas-solvent complex.

13. The method of claim 12, including separating said acid gas solvent complex from said fluid stream.

14. The method of claim 13, including regenerating said solvent by releasing said acid gas.

15. The method of claim 14, including recycling said regenerated solvent for contacting said fluid stream.

* * * * *